United States Patent [19]

de Groot et al.

[11] Patent Number: 4,769,946
[45] Date of Patent: Sep. 13, 1988

[54] TRANSPLANT TRAY

[75] Inventors: Peter F. de Groot, Monterey; Gregory L. Ganick, Hollister, both of Calif.

[73] Assignee: Bud Antle, Inc., Salinas, Calif.

[21] Appl. No.: 927,255

[22] Filed: Nov. 4, 1986

[51] Int. Cl.[4] .............................................. A01G 23/02
[52] U.S. Cl. ............................................................ 47/73
[58] Field of Search .................... 47/73, 86, 85, 82, 83, 47/77, 84, ; 220/23.6, DIG. 27; 217/26.5; 34/238, 237; 206/585, 586, 587

[56] References Cited

U.S. PATENT DOCUMENTS

| 1,739,895 | 12/1929 | Gamble | 211/126 |
|---|---|---|---|
| 2,655,283 | 10/1953 | Moldt | 220/22 |
| 3,356,462 | 12/1967 | Cooke et al. | 220/23.6 |
| 3,539,071 | 11/1970 | Ludder | 220/23.4 |
| 3,561,158 | 2/1971 | Marcan | 47/34.13 |
| 3,667,159 | 6/1972 | Todd | 47/34.13 |
| 3,703,050 | 11/1972 | Edwards | 47/84 |
| 3,788,002 | 1/1974 | Suchka | 47/34.13 |
| 3,931,694 | 1/1976 | Krikorian | 47/34.13 |
| 3,965,164 | 6/1976 | Kienholz | 47/14 |
| 3,965,614 | 6/1976 | Kienholz | 47/14 |
| 4,118,892 | 10/1978 | Nakamura et al. | 47/66 |
| 4,242,834 | 1/1981 | Olsen | 47/73 |
| 4,296,569 | 10/1981 | Edwards | 47/73 |
| 4,389,814 | 6/1983 | Andreason et al. | 47/73 |
| 4,495,725 | 1/1985 | Talbott | 47/85 |

FOREIGN PATENT DOCUMENTS

| 906416 | 8/1972 | Canada . | |
| 917579 | 12/1972 | Canada . | |
| 1009843 | 5/1977 | Canada | 47/73 |
| 1086501 | 9/1980 | Canada . | |
| 962699 | 6/1950 | France | 47/85 |
| 1268626 | 12/1961 | France | 47/73 |
| 1437556 | 3/1966 | France | 47/86 |
| 2493272 | 5/1982 | France | 47/86 |
| 2543793 | 10/1984 | France | 47/77 |
| 7406925 | 5/1974 | Netherlands | 47/73 |
| 737660 | 9/1955 | United Kingdom | 47/73 |

Primary Examiner—James R. Feyrer
Attorney, Agent, or Firm—Majestic, Gallagher, Parsons & Siebert

[57] ABSTRACT

A transplant tray comprises a number of germination cells, each cell including side walls for holding and retaining a growth medium and seeds or seedlings for germination. Each cell has an opening at the top for retrieval of the growth medium and seedlings for transplanting after germination. The cells are connected to or are integral with one another forming a planar structure. The tray further comprises a skirt connected to or integral with the perimeter of the planar structure. When two trays are stacked the skirts of the two trays are nested within each other thereby enclosing the space between the two trays forming a germination chamber. Vent holes of appropriate sizes are provided in the skirts permitting limited and controlled gas exchange between the germination chamber and the environment to enhance the uniformity of germination conditions within the chamber. The vent holes are not so large as to cause significant loss of moisture to an uncontrolled environment. Stand-offs maintain a desired separation between trays when stacked to prevent undesirable disturbance and scraping off of growth medium and seeds. The skirt is slightly tapered to permit nesting of trays, whether empty or full.

21 Claims, 3 Drawing Sheets

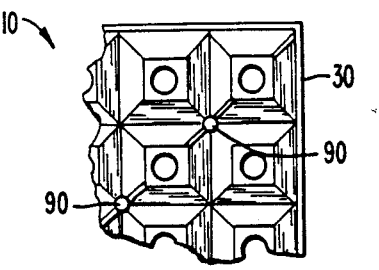
FIG._3.
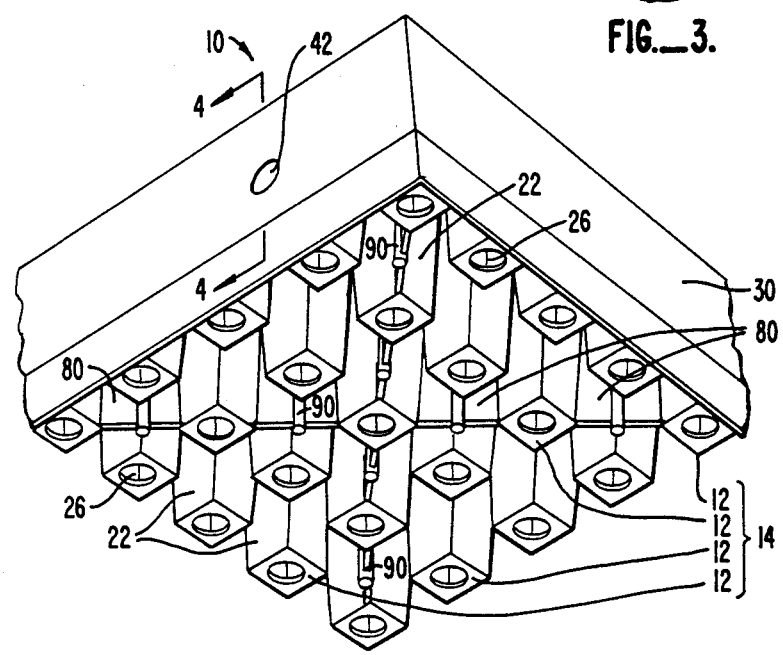
FIG._1.
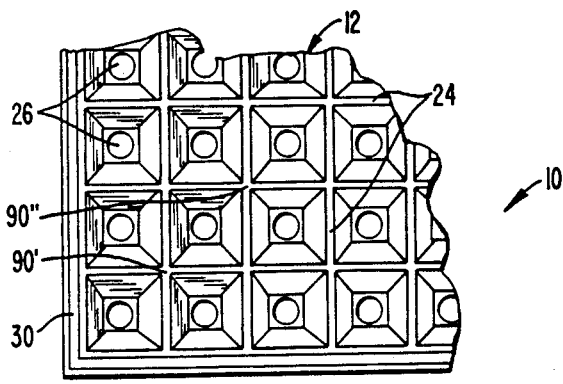
FIG._2.

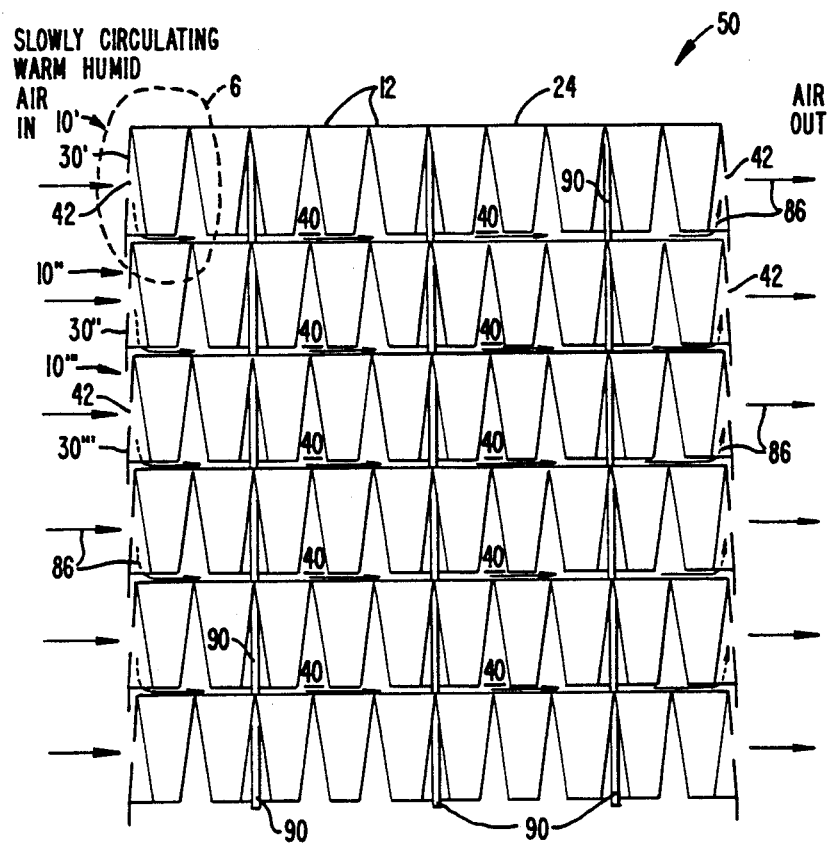
FIG._4.

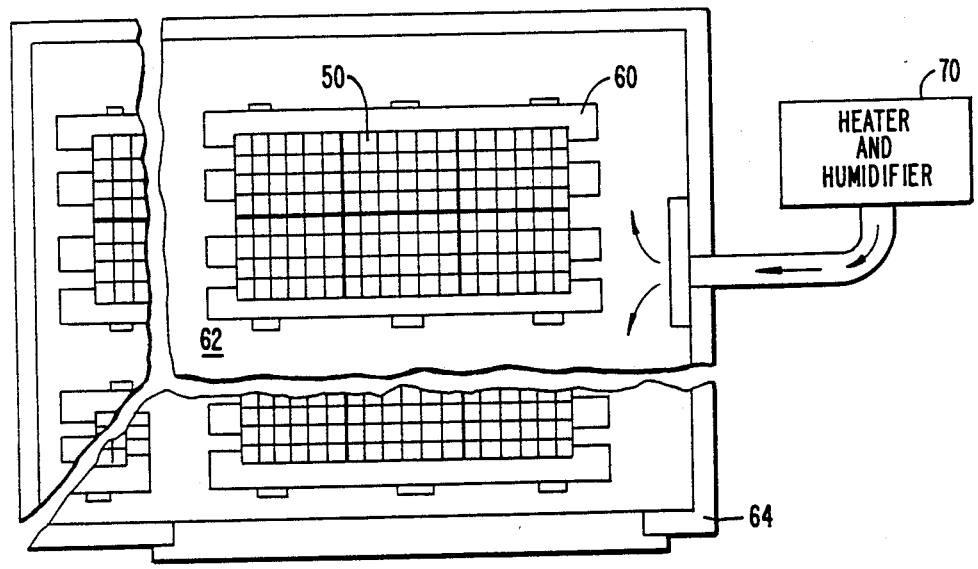
FIG._5.
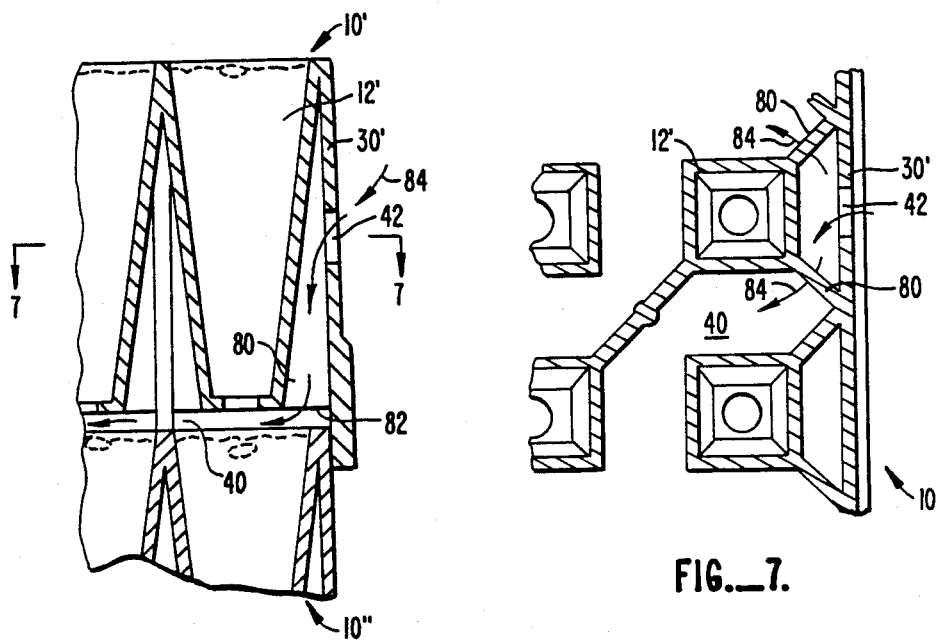
FIG._6.
FIG._7.

TRANSPLANT TRAY

BACKGROUND OF THE INVENTION

This invention relates in general to transplant trays and in particular to a transplant-tray which can be used to provide a germination chamber.

Large scale farming operations for crops such as celery, cauliflower, peppers and tomatoes entail the necessity for transplanting millions of seedlings each year. The seedlings are normally started from seeds in a controlled environment such as that within a greenhouse. Upon reaching a desired size, the seedlings are transplanted for field growth until maturity. Since an extremely large number of seedlings are transplanted and cultivated each year, savings of a fraction of a cent per seed will result in a substantial increase in the profits of the farming operation.

In large scale produce farming, transplant trays are frequently used for seed germination. Typically a transplant tray comprises a number of individual cells. The cells are filled to the top with a growth medium (usually a mixture of soil and peat moss). The center of the growth medium in each cell is then pressed from above to form a depression for receiving a seed. Seeds are then dropped onto the trays so that the center depression in the medium of each cell would receive one seed. The trays are then stacked on to a pallet and the pallet of trays is in turn transported by forklifts, trailers or trucks to a greenhouse. Each tray is then laid out in the greenhouse; in modern greenhouses, it is laid out on T-shaped support beams known as T-rails in the greenhouse, but in older greenhouses, it is simply laid out on benches or on the ground. While in the greenhouse, the seeds germinate and the seedlings grow until they emerge from the growth medium in a few days.

The seedlings are allowed to grow until they reach a desired size and until the growth media in the cells are bound by the roots of the seedlings. The transplant trays are then transported to the field. The seedlings are transplanted in a manner so that the roots of the seedlings and the growth medium bound by the roots remain intact to reduce transplant shock to the seedlings as is well known in the art. After transplanting, the crops are then cultivated until maturity upon which they are harvested.

A transplant tray commonly used in produce farming is in the form of a solid expanded or foamed polystyrene body with holes therein to form the cells, such as that shown in FIG. 1 of U.S. Pat. No. 3,667,159 to Todd. Each cell is generally of squared configuration and tapers downwardly into a small opening at the bottom. A conventional tray such as that proposed by Todd is disadvantageous for a number of reasons. Parts of the foamed polystyrene tray may break off particularly at the edges, so that the cells at the edge of the tray cannot retain as much growth medium as is necessary for the healthy growth of seedlings and may even cause the roots of seedlings to grow outside the cells. When the trays are stacked onto a pallet and the pallet transported by forklifts, trailers or trucks to the greenhouse, the top part of a tray in the stack is in contact with the bottom part of the tray immediately above. When the trays are filled with growth medium, some cells may be overfilled so that the growth medium and the seeds therein are at elevations above the top of the tray. Thus, when another tray is stacked on top of such tray, the growth media and the seeds above the top of the tray may be scraped off by the tray immediately above in the stacking process or in the subsequent transportation. This reduces yield.

When the above-described foamed polystyrene trays are used, the roots of the seedlings frequently grow into the polystyrene material forming the side walls of the cells so that when the seedlings are transplanted, parts of the roots may be broken when the seedlings are pulled from the cell, thereby damaging the seedlings. Furthermore, the polystyrene trays are light so that when empty trays are transported by forklifts or trucks over bumpy roads, the stacks of empty trays are unstable and may fall off the forklift or truck. A strong wind may also scatter the trays. The above-described disadvantages have been remedied to some extent by using improved injection molded plastic trays. When the plastic trays are empty, they can be stacked to improve stability during transport on bumpy roads; they are also heavier so that they are not as likely to be scattered by wind. Such plastic trays are available commercially from several manufacturers. However, the plastic trays are similar to the standard expanded (or foamed) polystyrene trays in that, when such trays are filled with growth media and stacked, the bottom portions of the cells of a tray in the stack are in contact with the growth media contained in the tray immediately below when stacked, so that the growth media and seeds at elevations above the top of the tray below may again be scrapped off. In the case of some types of plastic trays now available, the bottom portions of cells of a tray may actually compress the growth media and seeds in the cells of the tray immediately below. It is therefore desirable to provide trays which do not have such disadvantageous when stacked.

As described above, when the seedlings reach a certain stage of development, the seedlings together with the growth medium are ready to be transplanted to a more permanent location for cultivation until maturity. Crops such as celery are left in the greenhouse typically for 70-80 days before they are transplanted whereas cauliflower is typically left for 30-50 days. During the entire process from germination until maturity, it is desirable to provide conditions which will insure that the crops mature at about the same time. The resulting uniformity at the time of harvest increases the percentage of crops which can be harvested at one time which in turn results in higher yields and/or reduced harvesting cost.

Once the seedlings are transplanted, they are usually in an open field where the soil, water supply, fertilizer and weather conditions are much less controllable than when they are in a greenhouse. Therefore to increase the chances that a batch of crops will mature at the same time, it is important that they germinate and emerge at about the same time while they are still in a controlled environment such as in a greenhouse. For this reason, it is important to provide germination conditions which are uniform for the entire batch of seeds so that they will emerge from the growth media at about the same time. To provide uniform germination conditions, it is desirable for the transplant trays to be laid out in the greenhouse immediately after seeding so that the environment surrounding the trays may be controlled to be uniform. Furthermore, the conditions in the greenhouse may be controlled to optimize germination. With most crops, this means heating the greenhouse which is expensive.

In order to save expensive space in the greenhouse, some growers elect to keep their seeded trays in a stack for several days in an uncontrolled environment, such as in an open field where the stack of trays is covered by tarpaulin. When left in an uncontrolled environment, temperature within the stack of filled trays is seldom consistent and oxygen starvation can occur in the middle of the stack. Uneven temperature and humidity within the stack frequently cause non-uniformity in germination and emergence. Thus, when conventional transplant trays are used, a grower must choose between letting the seeded trays occupy expensive space in a greenhouse or suffer non-uniform germination and emergence. It is therefore desirable to provide transplant trays which enhances the uniformity of germination and emergence when the stack of trays are left in an uncontrolled environment.

Different solutions have been proposed for improving uniformity of growth when the stacks of seeded trays are left in an open area. Thus, the stacks may be placed in storage bins to reduce moisture loss and to increase the uniformity of temperature and humidity uniformity within the stacks. This procedure may require many storage bins and much labor. Thus the limited improvement in moisture retention and growth uniformity using the bins is achieved only at considerable expense. Such solution is therefore not entirely satisfactory.

In U.S. Pat. No. 3,965,614, Kienholz describes an apparatus for sprouting seeds such as bean sprouts. The apparatus comprises a vertical arrangement of alternately stacked base members and dish members. The beans to be sprouted are placed on the dish members which are formed with a foraminous bottom wall and an upturned peripheral side wall. Each dish member is then covered by a base member which has an imperforate top wall with a recessed portion for retaining water. Each dish member rests on the top wall of a similar base member with water in its recessed portion. Thus, the beans to be sprouted in a dish member are kept humid by evaporation from the water retained by the recess in the top wall of the base member immediately underneath the dish member. The downturned side wall of the base member is spaced apart from the upturned side wall of the dish member. Since the radial dimension of the dish member is also less than the radial dimension of the base member, a passageway is formed between the chamber for sprouting seeds and the outside environment to assure ventilation of fresh air around the bean sprouts.

The apparatus proposed by Kienholz described above is apparently not suitable for transplanting. Transplant techniques usually require that the seeds germinate in a growth medium. The roots of the seedlings would grow in the medium so that, when the seedlings together with the growth media are transplanted, the seedlings would suffer much less shock as compared to seedlings whose roots are not surrounded by growth medium. Since Kienholz's dish members are foraminous, they are not suitable for retaining a growth medium. Hence Kienholz's apparatus is not suited for transplanting.

Furthermore, Kienholz did not provide individual compartments for individual seeds, so that the roots and seedlings sprouted will become entangled thus making transplanting cumbersome and frequently impossible. Since the sprouting chambers between the dish and base members are ventilated to the outside environment, water must be provided in the recess of the base members to insure a humid environment for sprouting. The provision of water in a transplanting environment may be difficult and costly. The apparatus proposed by Kienholz therefore appears to be disadvantageous for transplanting purposes.

A transplant apparatus is illustrated for example in Canadian Pat. No. 1,009,843 to Bergeron et al. Bergeron et al. disclose a seedling tray growing apparatus comprising a flat support plate having a number of openings through it to support a number of cells open at both the top and bottom ends, one cell in each of the openings. Each of the cells is filled with a growth medium and seeded. The support plate is supported on a frame with four corner legs. The upper corners of the frame for the support plate are recessed into which the corner legs of another support plate may fit; this allows stacking of support plates. The corner legs are of sufficient length to maintain the bottom of the cells above the supporting surface. This permits air circulation beneath the cells as required for air pruning of roots growing out of the bottom of the cells.

The apparatus disclosed by Bergeron et al. leaves the growth media and the seedlings in the cells exposed to the environment into which the trays are placed. When left in an open field, the growth media in the cells may lose moisture so quickly that germination may not occur unless they are continually watered. Netherlands Pat. No. 7,406,925 discloses a transplant device which shares the same disadvantages as those explained above for Canadian Pat. No. 1,009,843.

In U.S. Pat. No. 3,667,159, Todd discloses a seedling flat formed by a number of cells joined together, with side walls and end walls surrounding the cells illustrated in FIGS. 4 and 5. In the patent, Todd did not explain the function of the side and end walls. However, as will be apparent from FIG. 5, the side and end walls have the same height as the cells so that no clearance is left between trays when stacked. Hence, the temperature and humidity conditions within the stack may be uneven. The, growth media and seeds left on trays at elevations above the tops of the trays may be scraped off. When the trays are filled and stacked, the roots of the seedlings will apparently not be automatically air pruned. Moreover, the seedling flats of FIGS. 4 and 5 of Todd cannot be nested so that a stack of empty flats may be scattered by wind and be unstable in transport over bumpy roads.

SUMMARY OF THE INVENTION

The transplant tray of this invention comprises a plurality of germination cells, each cell including side walls for holding and retaining a growth medium and seeds or seedlings therein for germination. Each cell defines an opening at the top for retrieval of the growth medium and seedlings for transplanting after germination. The cells are connected to or are integral with one another forming a planar structure, said planar structure having a perimeter. The transplant tray further comprises an enclosure means connected to or integral with the perimeter of the structure so that when the structure is stacked vertically with the planar structure of a second transplant tray of the same type, the space between the two structures will be enclosed by the enclosure means of the two trays to reduce the lost of moisture present in said space.

Thus, when two transplant trays are stacked, the enclosure means of the trays enclose the space between the two trays so that the space forms a germination chamber. Loss of moisture in the chamber is reduced. A grower may therefore leave a stack of trays in an open field with little fear that the growth media and the seeds or seedlings will dry out.

In the preferred embodiment, the enclosure means is a skirt which surrounds the perimeter of the planar structure of the tray. Preferably, the skirt defines therein at least one vent hole to allow limited gas exchange between the germination chamber and the environment into which a stack of trays is placed. The hole is of such size relative to the size of the chamber that, when a stack of trays is placed in an open field, the loss of moisture from the chamber to the environment through the hole does not significantly affect germination. The hole is of such size that when a stack of trays is placed in a controlled atmosphere, the atmospheric condition in the germination chamber will conform to a desired condition.

According to another aspect of the invention, means are provided to maintain a separation between trays when stacked, so that after the trays are filled with a growth medium and seeded, the growth medium and seeds that remain at an elevation above the top of a tray will not be scraped off when the trays are stacked or transported. In the preferred embodiment, the means for maintaining a separation between trays when stacked are stand-offs extending from the top surface of the planar structure downwards to a location beneath the bottom of the cells so that when the trays are stacked, the bottom of the stand-offs of a tray will rest on the top surface of the planar structure of the tray immediately below to maintain the separation. If the stand-offs are located in identical locations of all the trays in the stack, the weight of trays below and their contents will be transmitted to the trays below through stand-offs so that the entire weight of the stack will be supported through the stand-offs.

Accordingly to yet another aspect of the invention, the skirt of the tray is slightly tappered vertically so that when the trays are stacked, the skirt of the top tray will be nested within the skirt of the bottom tray to increase the stability of the stack, which is particularly important when the trays are empty and when the stack is transported in windy weather or over bumpy roads.

BRIEF DESCRIPTION OF THE DRAWINGS

FIG. 1 is a perspective view of a portion of a transplant tray to illustrate the preferred embodiment of the invention.

FIG. 2 is a top view of a corner of the transplant tray of FIG. 1.

FIG. 3 is a bottom view of a corner of the transplant tray of FIG. 1.

FIG. 4 is a cross-sectional view of a number of transplant trays stacked together to illustrate the preferred embodiment of the invention.

FIG. 5 is a partially schematic and partially top view of a system which includes transplant trays for providing controlled germination conditions to illustrate the invention.

FIG. 6 is an enlarged cross-sectional view of a portion of two transplant trays stacked together within the dotted line 6 of FIG. 4 to illustrate the preferred embodiment of the invention.

FIG. 7 is the cross-sectional view of tray 10' of FIG. 6 taken along the line 7—7 in FIG. 6 to illustrate the preferred embodiment of the invention.

DETAILED DESCRIPTION OF THE PREFERRED EMBODIMENTS

FIG. 1 is a perspective cutaway view of one corner of a transplant tray 10 viewed at an angle from the bottom of the tray to illustrate the preferred embodiment of the invention. As shown in FIG. 1, tray 10 comprises a number of cells 12 connected together or integral with one another to form a planar structure 14. Each of the cells 12 comprises side walls 22 for holding and retaining a growth medium and seeds or seedlings therein for germination.

FIG. 2 is a top view of a corner of tray 10 to illustrate the preferred embodiment of the invention. As better shown in FIG. 2, each of the cells 12 defines an opening at the top for retrieval of the growth medium and seedlings (not shown in FIG. 2) for transplanting after germination. As shown in FIG. 2, the cells 12 are connected to or integral with each other by their top portions of their side walls, so that the top surface of the planar structure 14 is formed by the top surface of the common side walls of the cells 12, forming a grid-like surface 24 as shown in FIG. 2. It will be understood, however, that cells 12 may be connected in a manner different from that illustrated in FIG. 2, and that all such configurations are within the scope of the invention. At least some of the cells 12 define holes 26 at the bottom for drainage and for air pruning of roots.

As best shown in FIG. 1, tray 10 comprises a skirt 30 which completely surrounds the perimeter of the planar structure 14. FIG. 3 is a bottom view of a corner of the transplant tray of FIGS. 1 and 2. FIG. 4 is a cross-sectional view of a stack of transplant trays of the same type as tray 10 illustrated in FIGS. 1-3, where the cross-section of each tray is taken along a line similar to line 4—4 in FIG. 1. As best shown in FIG. 4, when the trays are stacked together as shown in the figure, the skirts of two contiguous trays overlap to enclose the space between the two trays. Thus, as shown in FIG. 4, the skirts 30', 30" of trays 10', 10" enclose the space 40 between the two trays. Similarly, for the spaces 40 between the trays 10", 10'" and between each pair of contiguous trays below, space 40 is enclosed by the two skirts of the contiguous trays.

As shown in FIGS. 1 and 4, skirts 30, 30', 30", 30'" . . . each defines therein one or more vent holes 42. Vent holes 42 are of such size relative to the size of the space 40 that when the stack of trays 50 of FIG. 4 is placed in an uncontrolled environment, the loss of moisture from spaces 40 to the environment through holes 42 does not significantly affect germination. Thus, in contrast to conventional transplant trays described above, the transplant tray of this invention encloses the space between trays when stacked to reduce the loss of moisture present in the space and preserves such moisture necessary for germination. As described above in reference to FIG. 4, the space 40 between two contiguous trays are enclosed by the skirts of such trays. While in the preferred embodiment as shown in FIG. 4, the trays are provided with skirts for enclosing the spaces between contiguous trays, it will be understood that other means for enclosing the spaces between trays may be used and are within the scope of this invention.

While the loss of moisture from spaces 40 through holes 42 to the environment may not significantly affect germination, vent holes 42 do permit gas exchange through diffusion between spaces 40 and the environment surrounding the stack 50. The gas exchange will prevent oxygen starvation in the middle of the stack and increase the uniformity of germination conditions throughout the stack. This will enhance uniformity in germination and emergence. As will become clear below, such gas exchange is further limited by the structure of the tray 10 to reduce the loss of moisture from spaces 40.

The size of the holes 42 is such that when the stack 50 of FIG. 4 is placed in a controlled environment as illustrated in FIG. 5, the atmospheric condition in the spaces 40 will conform to a desired condition for germination. FIG. 5 is a partly schematic and partly broken away top view of a system for providing the desired germination conditions. As shown in FIG. 5, one or more stacks of trays 50 are each placed on a pallet 60 and the pallets are then placed in a chamber 62 enclosed within wall 64. As will be evident from FIG. 5, a large number of stacks 50 may be placed in chamber 62. The temperature and humidity within chamber 62 are controlled by a heater and humidifier 70 which supplies warm and humid air to chamber 62. The gas exchange between spaces 40 and chamber 62 causes the atmospheric conditions within stacks 50 to conform to the desired temperature and humidity conditions for germination. Since gas exchange occurs through the vent holes 42 between all the spaces 40 and chamber 62, the temperature and humidity within each of the spaces 40 are made to conform to the desired germination conditions. Hence, substantially uniform temperature and humidity conditions are achieved throughout every portion of the stacks 50. Therefore the seeds will germinate and emerge at about the same time. Since the humidity and temperature within spaces 40 can be controlled by controlling the heater and humidifier 70, the germination conditions within spaces 40 can be optimized to accelerate the germination process.

An additional feature of tray 10 helps to achieve controlled gas exchange between spaces 40 and the environment. As best shown in FIG. 1, cells 12 are interconnected by webs 80 to strengthen the planar structure 14. FIG. 6 is a cross-sectional view of a portion of the stack 50 of FIG. 4 within the dotted line 6 in FIG. 4. FIG. 7 is a cross-sectional view of a portion of tray 10' taken along the line 7—7 in FIG. 6. To simplify the figure, tray 10" has been left out in FIG. 7. As shown in FIG. 6, webs 80 enclose the space between cell 12' and skirt 30' except for an opening 82 near the bottom of cell 12'. Therefore in order for the warm and humid air supplied by heater and humidifier 70 to reach space 40 between the trays, such air must move through paths such as that indicated by arrow 84 in FIGS. 6 and 7; that is, such air must pass through the space enclosed by cell 12', webs 80 and skirt 30', through the opening 82 and then into space 40.

With the appropriate settings for air flow from heater and humidifier 70, the atmospheric conditions within spaces 40 in stacks 50 can be made to conform to the desired conditions within a desired short time period in a manner described below. As shown in FIG. 4 the skirts of the trays are provided with at least two vent holes one on each side of the tray. A conventional means (not shown) may be provided so that the warm and humid air is supplied to the stack 50 through the vent holes on one side of the stack and exits through the vent holes on the other side of the stack along paths such as path 86 in FIG. 4.

The above described structure for confining the gas exchange by means of webs 8 adjacent to vent hole 42 is also advantageous when stack 50 is placed in an uncontrolled environment. When a stack of trays of the type disclosed in the Canadian patent to Bergeron et al is placed in the open field, air currents generated by air convection are free to pass through the spaces between the trays in the stack so that moisture will be lost from the trays. With a stack of trays of the type disclosed herein, substantially no air currents will pass through the spaces between trays. Instead, gas exchange will occur substantially only through diffusion through vent holes 42. Because of the structure of the tray, in order for moisture to escape from space 40 to the uncontrolled environment, the moisture must pass through opening 82 before it can escape through vent hole 42. These factors greatly reduce the rate at which moisture will be lost to the environment. The circuitous path for the gas exchange such as that illustrated by arrows 84 in FIGS. 6 and 7 enhances the uniformity of temperature and humidity within space 40 so that the temperature and humidity in the middle of the tray will not differ significantly from those closer to the vent holes.

As described above, the size of the vent holes relative to the space 40 should be small enough so that the loss of moisture to an uncontrolled environment will not be significant. On the other hand the size of the vent hole 42 should not be too small, thereby permitting adequate gas exchange with a controlled environment to achieve uniform temperature and humidity conditions within the stack. For such purposes it may be desirable for the ratio of the combined cross-sectional areas of the vent holes of a tray to the volume of the space between two contiguous trays when stacked to be substantially in the range of one square inch: 10 cubic inches to 1 square inch: 1000 cubic inches. A satisfactory ratio may be about 1 square inch: 250 cubic inches.

In order to maintain a separation between the cells in two contiguous trays when stacked, stand-offs 90 are provided as shown in FIG. 1. As shown in FIG. 1, such stand-offs are integral with the webs 80 and extend from the junction point of four cells downwards in the bottom view of the tray in FIG. 3. Webs 80 also serve as support for the stand-offs 90. A comparison of the top and bottom views in FIGS. 2 and 3 will indicate that when two trays are stacked stand-offs 90 of the top tray in the stack will rest at intersection points such as points 90' 90" of the grid-like top surface 24 of the bottom tray in the stack. In such manner, a desired separation is maintained between the planar structures of two trays when stacked. This separation prevents the bottom portions of cells in a tray from disturbing the growth medium and seeds in a tray immediately below in a stack, and prevents the growth medium and seeds on the bottom tray at elevations above the top of the bottom tray from being scraped off. A desired separation may be about ⅛ inches.

As shown in FIG. 1, cells 12 define holes 26 at the bottom for drainage. Stand-offs 90 preserve a separation between trays so that roots growing into holes 26 will encounter air in space 40 and will be air pruned.

It is preferably for tray 10 to have a sufficient number of stand-offs 90 and for the stand-offs to be of sturdy construction for supporting the weight of the trays when stacked. Thus, as shown in FIG. 4, the weight of the trays, the growth medium and the seeds in the trays above a particular tray is transmitted through the stand-offs of such tray to the stand-offs of the trays below. In such manner the weight of all the trays, the growth media and seeds in the entire stack is transmitted through a string of stand-offs 90 to a supporting surface (not shown in FIG. 4) for the stack.

As best shown in FIG. 4, the skirts of the trays are slightly tapered vertically so that when the trays are stacked the skirt of the top tray will be nested within the skirt of the bottom tray to increase the stability of the stack. As explained above, in produce farming operations, empty trays are frequently transported or stored in stacks. When the empty trays of the type described herein are stacked, the skirts allow the trays to be nested to improve the stability of the stack as compared to the standard polystyrene trays. As best shown in FIG. 4, the skirt is of such height that it extends beyond the bottom of the cells 12 so that when the tray is placed on a supporting surface (not shown in FIG. 4) of a greenhouse, the supporting surface is in contact with the bottom side of the skirt and the bottoms of such cells are elevated from the supporting surface to increase the uniformity of air pruning of roots.

In a particular implementation of the preferred embodiment that may be satisfactory, the base of the skirt is about 12¼ inches by 19 inches in dimensions, the height of the skirt about 2¾ inches, the cells about 2¼ inches deep, the stand-offs about ⅛ inch and the nesting between skirts of contiguous trays about ⅜ inch.

From the above, methods for providing controlled environments from germination using two or more transplant trays have been described. By simply stacking the planar structure of a first tray vertically with a planar structure of a second tray, the space between the two structures is enclosed by the skirts of the two trays to reduce the loss of moisture in the space. By vertically stacking the trays one on top of another and by controlling the atmospheric condition of the environment surrounding the stack, the atmospheric conditions in the spaces are then made to conform substantially to a desired condition.

From the above, it will be evident that a transplant tray with many advantages has been described. When a stack of such trays is placed in an uncontrolled environment, the spaces between the trays are essentially enclosed so that such spaces become germination chambers. The vent holes in the skirts of the trays permit limited gas exchange with the uncontrolled environment through circuitous paths. Such a slow gas exchange enhances the uniformity of germination conditions within the stack without a rapid loss of moisture. When a stack of such trays is placed in a controlled environment, the germination conditions can be made uniform throughout the stack and can be optimized. Thus, a particularly advantageous and versatile transplant tray has been described. The stand-offs maintain the desired separation between trays when stacked to prevent undesirable disturbance or scraping off of growth medium and seeds. The slightly tapered skirts enable nesting of empty trays when stacked to improve stability.

The above description of construction and method of the invention are merely illustrative thereof, and various details and changes in the structure and steps of the method thereof may be within the scope of the appended claims.

We claim:

1. A method of providing a controlled environment for germination using at least two transplant trays, each tray including (a) a plurality of growth cells, each cell including side walls for holding and retaining a growth medium and seeds therein for germination of the seeds into seedlings and growth of the seedlings, each cell defining an opening at the top for retrieval of the growth medium and seedlings for transplanting after growth of the seedlings to a predetermined stage, said cells connected to one another to form a planar structure, said planar structure having a perimeter; and (b) enclosure means connected to the perimeter of the structure; said method comprising:

putting growth medium and at least one seed into at least one cell in a first tray; and stacking the planar structure of the first tray underneath the planar structure of a second tray to enclose the space between the two structures and the growth medium by means of the enclosure means and the planar structures of the two trays, to reduce the loss of moisture present in said space and in the growth medium, and maintaining a separation between the planar structures of the two trays, thereby permitting the at least one seed to germinate while the trays are stacked.

2. A method of providing a controlled environment for germination using a plurality of transplant trays, each tray including (a) a plurality of growth cells, each cell including side walls for holding and retaining a growth medium and seeds therein for germination of the seeds into seedlings and growth of the seedlings, each cell defining an opening at the top for retrieval of the growth medium and seedlings for transplanting after growth of the seedlings to a predetermined stage, said cells connected to one another to form a planar structure, said planar structure having a perimeter; (b) skirt means connected to the perimeter of the structure, and (c) tray separtating means for spacing the trays when stacked, wherein the trays are in a controlled environment, wherein when growth medium is placed in at least some of the cells of the trays and the trays are placed in a vertical stack, the skirts of two contiguous trays enclose the space between the two trays and the growth medium in the cells in the bottom tray and wherein the skirt of one of the two trays defines a vent hole to allow gas exchange between the space and the enviornment through said hole; said method comprising:

putting growth medium and at least one seed into at least one cell in a first tray; and vertically stacking the first tray underneath a second tray, so that the skirts of the trays enclose the spaces and the growth medium in the at least one cell between the trays except for the vent hole which controls gas exchange between the spaces and the environment; and controlling the atmospheric condition of the environment so that the atmospheric condition in the spaces substantially conforms to a desired condition, thereby permitting the at least one seed to germinate in the desired condition while the trays are stacked.

3. A transplant tray for providing a germination environment when stacked vertically with a second transplant tray having the same structure as that of the tray claimed, said tray comprising:

a plurality of growth cells, each cell including side walls for holding and retaining a growth medium and seeds therein for germination of the seeds into seedlings and growth of the seedlings, each cell defining an opening at the top for retrieval of the growth medium and seedlings for transplanting after the seedlings have grown to a predetermined stage, said cells connected to one another forming a planar structure, said planar structure having a perimeter; and enclosure means connected to the perimeter of the structure, said structure including stand-off means so that when the structure is stacked vertically with the planar structure of the second transplant tray, the cells are spaced apart from the planar structure of the second tray, and the space between the two structures and the growth medium in the cells will be enclosed by the enclosure means and planar structures of the two trays to reduce the loss of moisture present in said space and in the growth medium in the cells.

4. The tray of claim 1, wherein said enclosure means comprises a skirt surrounding the perimeter of the structure.

5. The tray of claim 4, wherein at least some of the cells define holes at the bottom to allow drainage and air pruning of roots of the seedlings in such cells, and wherein said skirt is of such height that when said tray is placed on a supporting surface of a greenhouse, the supporting surface is in contact with the bottom side of the skirt, said skirt including means for causing the bottoms of such cells to be elevated from the supporting surface to increase the uniformity of air pruning of roots.

6. The tray of claim 4, wherein said skirt is slightly tapered vertically so that the tray is stacked with the second tray, the skirt of the top tray will be nested around the skirt of the bottom tray to increase the stability of the stack.

7. The tray of claim 4, wherein the skirts of the trays enclose the space between the two structures completely, except that at least one of the skirts defines at least one vent hole therein to allow gas exchange between the space and the exterior of said hole, the hole being of a predetermined size relative to the space so that when said two trays are stacked and placed in an uncontrolled environment, the loss of moisture from the space to the environment through the hole does not significantly affect germination, and so that when said trays stacked and placed in a controlled atmosphere, the atmospheric condition in the space conforms to a desired condition.

8. The tray of claim 7, wherein said tray is a unitary structure made by injection molding.

9. The tray of claim 7, wherein the skirt defines at least one pair of holes, one on each side of the perimeter of the structure, said holes being of such sizes that the ratio of their combined cross-sectional areas to the volume of the space between the trays when stacked is substantially in the range 1 sq. in.:10 cu. in. to 1 sq. in.:1000 cu. in.

10. The tray of claim 9, wherein said ratio is about 1 sq. in.:250 cu. in.

11. The tray of claim 3, wherein said stand-off means are connected to the cells and extending below the planar structure, so that when the tray is stacked vertically with the second tray, the stand-off means of the top tray will contact the top surface of the bottom tray to maintain a separation between the cells in the two trays, thereby preventing the bottoms of the cells in the top tray from disturbing the growth medium or seeds in the cells in the bottom tray and from scraping off the growth medium and seeds above the cells in the bottom tray.

12. The tray of claim 11, further comprising webs connecting the stand-off means to the cells and serving as supports for the stand-off means.

13. The tray of claim 11, wherein the top portions of the side walls of the cells are connected to one another to form the planar structure so that the planar structure has a grid-like top surface, and wherein the stand-off means comprises a plurality of stand-offs which are located at such locations relative to the cells that when two trays are stacked, at least some of the stand-offs of the top tray are supported by the grid-shaped top surface of the planar structure of the bottom tray to support the top tray.

14. The tray of claim 13, wherein the stand-off means each extends downwards from a junction point of four contiguous cells, so that when a number of trays are filled with growth media and seeded and then stacked, the weight of the trays and of their contents will be transmitted through the stand-off means to a supporting surface for supporting the stack.

15. A transplant tray for providing a germination environment when stacked vertically with a second transplant tray having the same structure as that of the tray claimed, said tray comprising:

a plurality of growth cells, each cell including side walls for holding and retaining a growth medium and seeds therein for germination of the seeds into seedlings and growth of the seedlings, each cell defining an opening at the top for retrieval of the growth medium and seedlings for transplanting after growth of the seedlings to a predetermined stage, said cells connected to one another forming a planar structure, said planar structure having a perimeter; and skirt means connected to the perimeter of the structure and wherein said skirt means is slightly tapered vertically so that when the tray is stacked with the second tray, the skirt of the top tray will be nested around the skirt of the bottom tray to increase the stability of the stack, and stand-off means are provided so that when growth medium and seeds are put into the cells of the two trays and the trays are stacked, the trays will be nested and the cells of the top tray will be spaced apart from the planar structure of the bottom tray as well as from the growth medium and seeds in the cells of the bottom tray, thereby preventing seeds and growth medium in the cells of the bottom tray from being disturbed.

16. The tray of claim 15, wherein at least some of the cells define holes at the bottom to allow drainage and air pruning of roots of the seedlings in such cells, and wherein the height of said skirt exceeds those of the cells so that when said tray is placed on a supporting surface of a greenhouse, the supporting surface is in contact with the bottom side of the skirt and the bottoms of such cells are elevated from the supporting surface to increase the uniformity of air pruning of roots.

17. A transplant tray for providing a germination environment when stacked vertically with a second transplant tray having the same structure as that of the tray claimed, said tray comprising:

a plurality of growth cells, each cell including side walls for holding and retaining a growth medium and seeds therein for germination of the seeds into seedlings, each cell defining an opening at the top for retrieval of the growth medium and seedlings for transplanting after growth of the seedlings to a predetermined stage, said cells connected to one another forming a planar structure, said planar structure having a perimeter;

separation means connected to the structure so that when the structure is stacked vertically with the planar structure of a second transplant tray, a desired separation is maintained between the two structures and between the growth medium in the cells of the bottom tray and the structure of the top tray, thereby preventing the bottoms of the cells in the top tray from disturbing the growth medium or seeds in the cells in the bottom tray and from scraping off the growth medium and seeds above the cells in the bottom tray; and barrier means surrounding the periphery of each transplant tray, said barrier means having means for limiting air circulation between the exterior and interior of a stack of said transplant trays.

18. The tray of claim 17, wherein said separation means comprises a plurality of stand-offs connected to the cells and extending below the planar structure, so that when the tray is stacked on top of the second tray, the stand-offs will contact the top surface of the second tray to maintain a separation between the cells in the two trays.

19. The tray of claim 18, wherein the top portions of the side walls of the cells are connected to one another to form the planar structure so that the planar structure has a grid-like top surface, and wherein the stand-offs are located at such locations relative to the cells that when two trays are stacked, at least some of the stand-offs of the top tray are supported by the grid-shaped top surface of the planar structure of the bottom tray to support the top tray.

20. The tray of claim 19, wherein the stand-offs each extends downwards from a junction point of four contiguous cells, so that when a number of trays are filled with growth media and seeded and then stacked, the weight of the trays and of their contents will be transmitted through the stand-offs to a supporting surface for supporting the stack.

21. The tray of claim 18, wherein said tray is a unitary structure made by injection molding.

* * * * *

UNITED STATES PATENT AND TRADEMARK OFFICE
CERTIFICATE OF CORRECTION

PATENT NO.  : 4,769,946

DATED       : Sept. 13, 1988

INVENTOR(S) : Groot et al.

It is certified that error appears in the above-identified patent and that said Letters Patent is hereby corrected as shown below:

Col. 10, line 33:  "separtating" should be --separating--;

line 42:  "enviornment" should be --environment--;

Col. 11, line 29:  insert --when-- between "that" and "the";

line 44:  insert --are-- between "trays" and "stacked".

Signed and Sealed this

Fourteenth Day of February, 1989

Attest:

DONALD J. QUIGG

Attesting Officer      Commissioner of Patents and Trademarks